(12) United States Patent
Lee et al.

(10) Patent No.: US 12,425,375 B2
(45) Date of Patent: Sep. 23, 2025

(54) APPARATUS FOR CONTROLLING AND BLOCKING USER ACCESS USING WEB APPLICATION PROXY

(71) Applicant: SGA Solutions Co., Ltd., Seoul (KR)

(72) Inventors: Ki Uk Lee, Seongnam-si (KR); Ju Young Park, Seongnam-si (KR); Bum Su Kim, Seoul (KR); Jeong Hoon Yoon, Goyang-si (KR)

(73) Assignee: SGA Solutions Co., Ltd., Seoul (KR)

( * ) Notice: Subject to any disclaimer, the term of this patent is extended or adjusted under 35 U.S.C. 154(b) by 114 days.

(21) Appl. No.: 18/337,128

(22) Filed: Jun. 19, 2023

(65) Prior Publication Data
US 2024/0171547 A1   May 23, 2024

(30) Foreign Application Priority Data
Nov. 17, 2022 (KR) .......................... 10-2022-0154090

(51) Int. Cl.
*H04L 9/40* (2022.01)
(52) U.S. Cl.
CPC ...... *H04L 63/0281* (2013.01); *H04L 63/0245* (2013.01); *H04L 63/101* (2013.01); *H04L 63/20* (2013.01)
(58) Field of Classification Search
CPC ............ H04L 63/0281; H04L 63/0245; H04L 63/101; H04L 63/20
See application file for complete search history.

(56) References Cited

U.S. PATENT DOCUMENTS

| | | | | |
|---|---|---|---|---|
| 10,958,662 | B1 * | 3/2021 | Sole | ................... H04L 63/0853 |
| 2007/0282951 | A1 * | 12/2007 | Selimis | ................... H04L 67/75 |
| | | | | 709/205 |
| 2008/0313728 | A1 * | 12/2008 | Pandrangi | ........... H04L 63/0281 |
| | | | | 711/E12.094 |
| 2014/0341109 | A1 * | 11/2014 | Cartmell | ................. H04L 43/50 |
| | | | | 370/328 |

(Continued)

FOREIGN PATENT DOCUMENTS

| | | |
|---|---|---|
| JP | 2008-234256 | 10/2008 |
| KR | 10-2013-0028323 | 3/2013 |

OTHER PUBLICATIONS

Office Action for Korean Patent Application No. 10-2022-0154090, dated Dec. 22, 2022.

*Primary Examiner* — Harris C Wang

(57) ABSTRACT

An apparatus for controlling and blocking user access using a web application proxy includes: a web server system; and a web application proxy installed in the web server system and configured to determine whether to provide the user with a web service by confirming access authority of a user using an external network, wherein the web application proxy includes: a packet processing module configured to collect and analyze request packets; a service control module configured to control the user access to the web service by extracting identification information of the user from the packets to confirm whether the user of the extracted identification information has the access authority to the web service; and an external policy management module configured to collect and manage an updated access control policy of the user and an updated policy for the web service by communicating with an external integrated policy management server.

5 Claims, 5 Drawing Sheets

(56) References Cited

U.S. PATENT DOCUMENTS

| | | | |
|---|---|---|---|
| 2015/0350111 A1* | 12/2015 | Xiu | H04L 49/15 370/254 |
| 2016/0191521 A1* | 6/2016 | Feroz | G06F 16/9535 726/1 |
| 2023/0146525 A1* | 5/2023 | Ball | H04L 45/745 370/392 |
| 2024/0171547 A1* | 5/2024 | Lee | H04L 63/101 |

* cited by examiner

【FIG. 1】
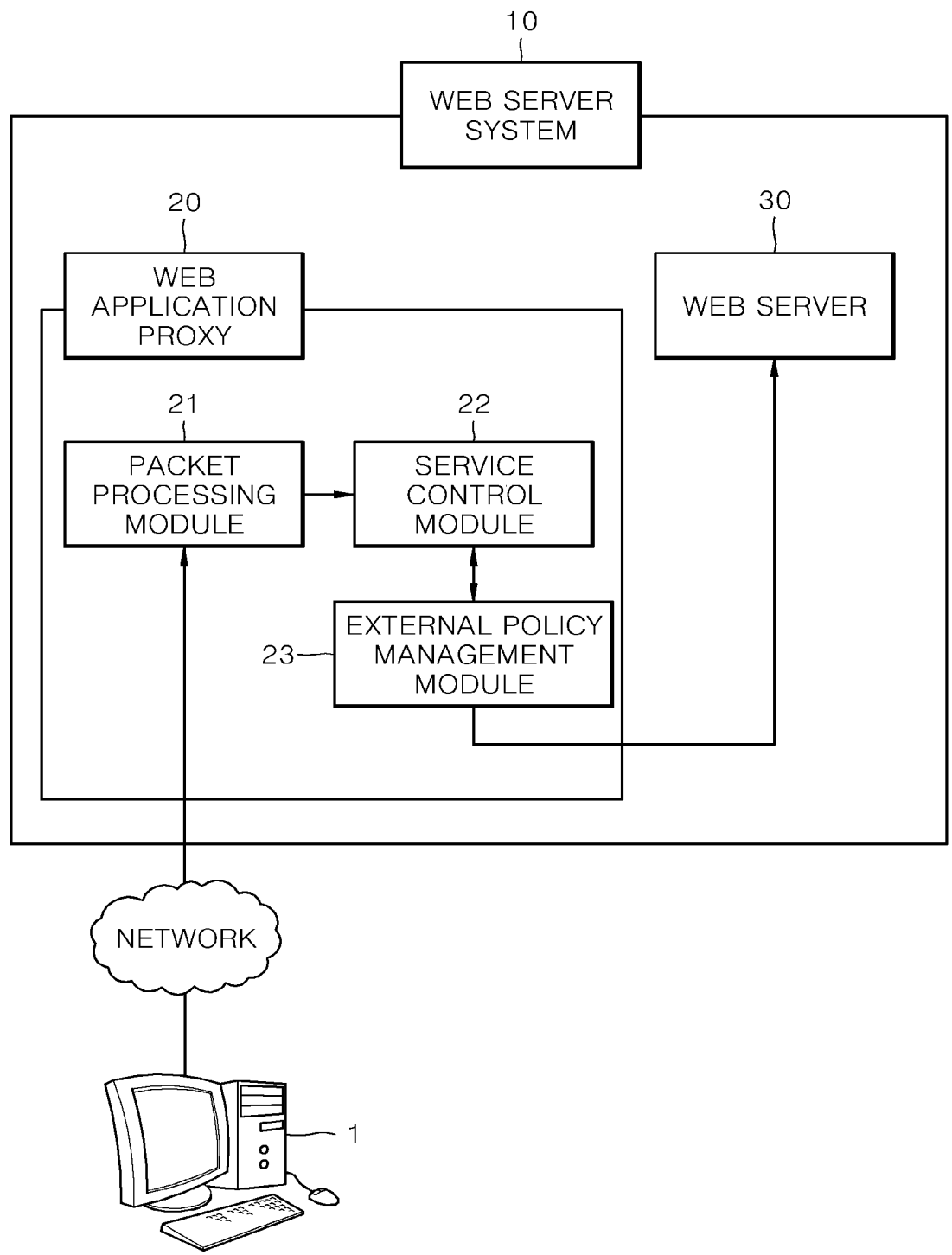

[FIG. 2]
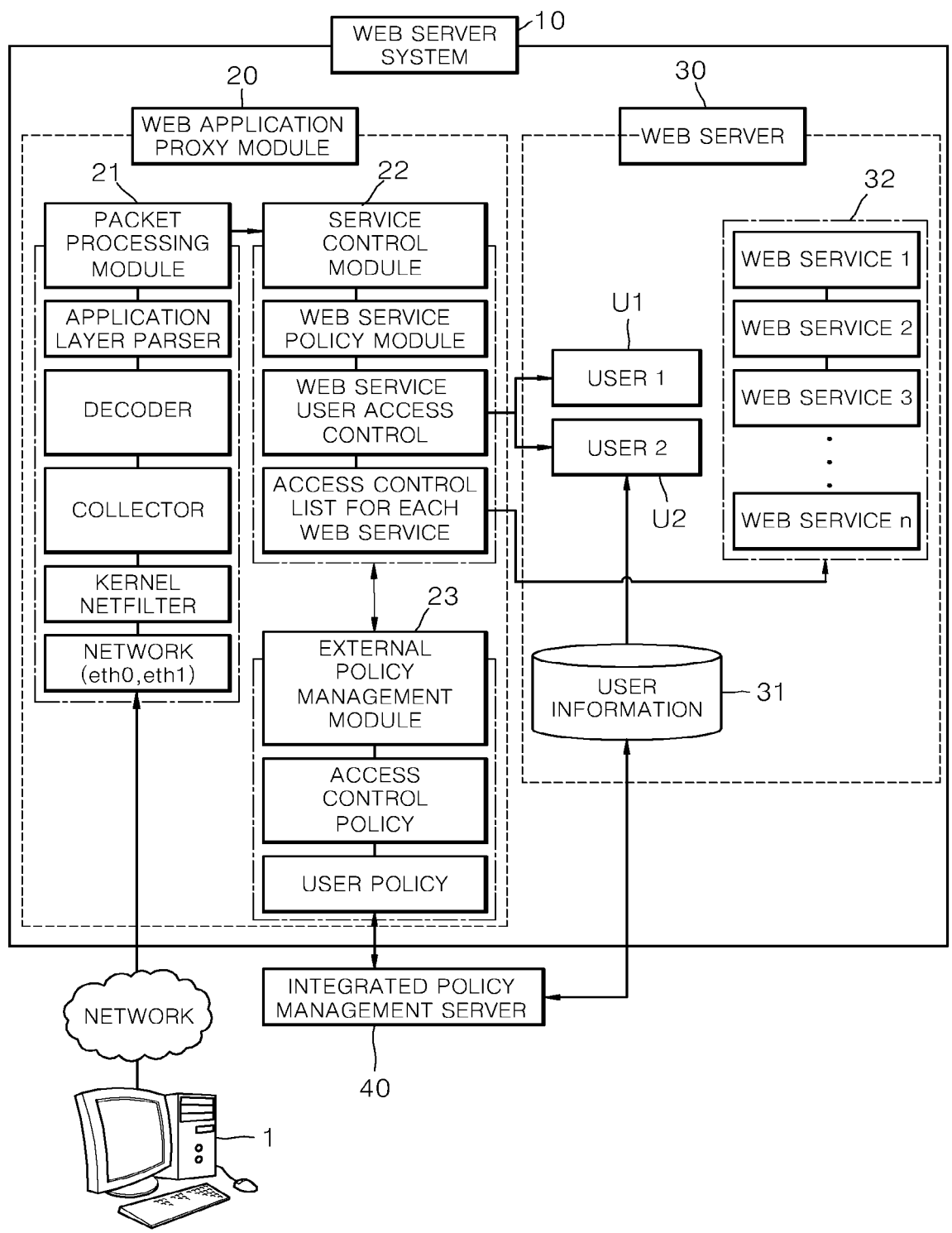

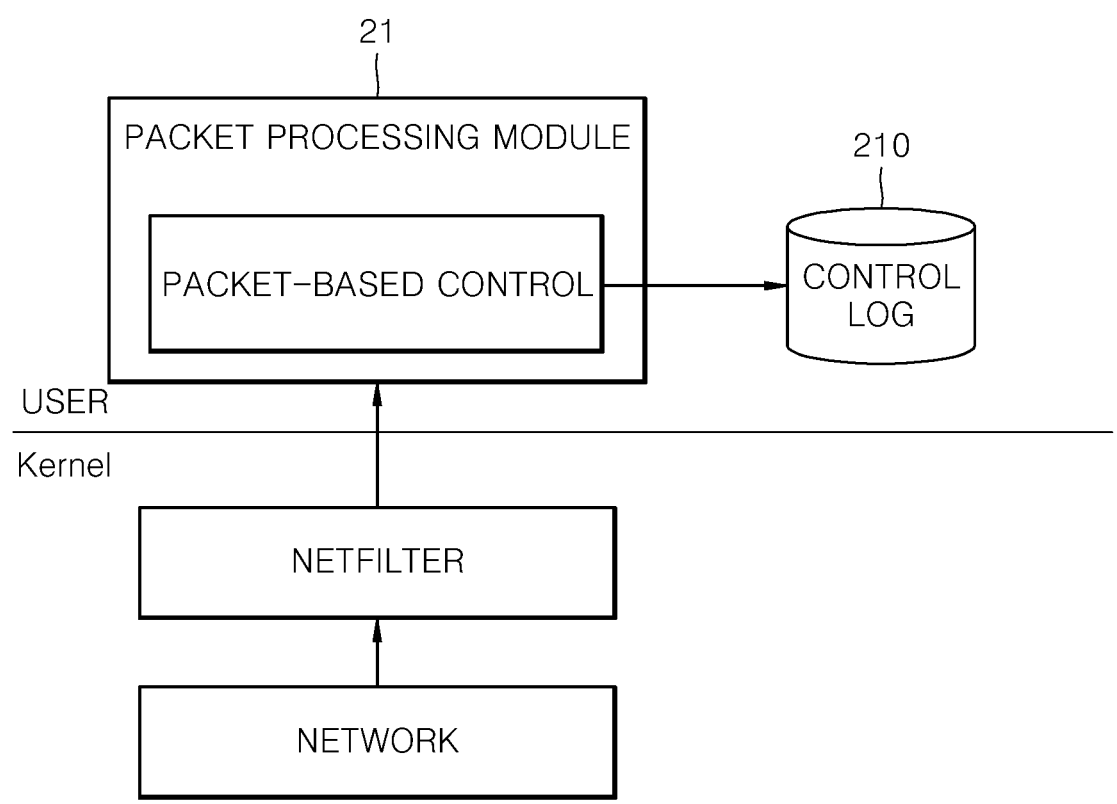
[FIG. 3]

【FIG. 4】
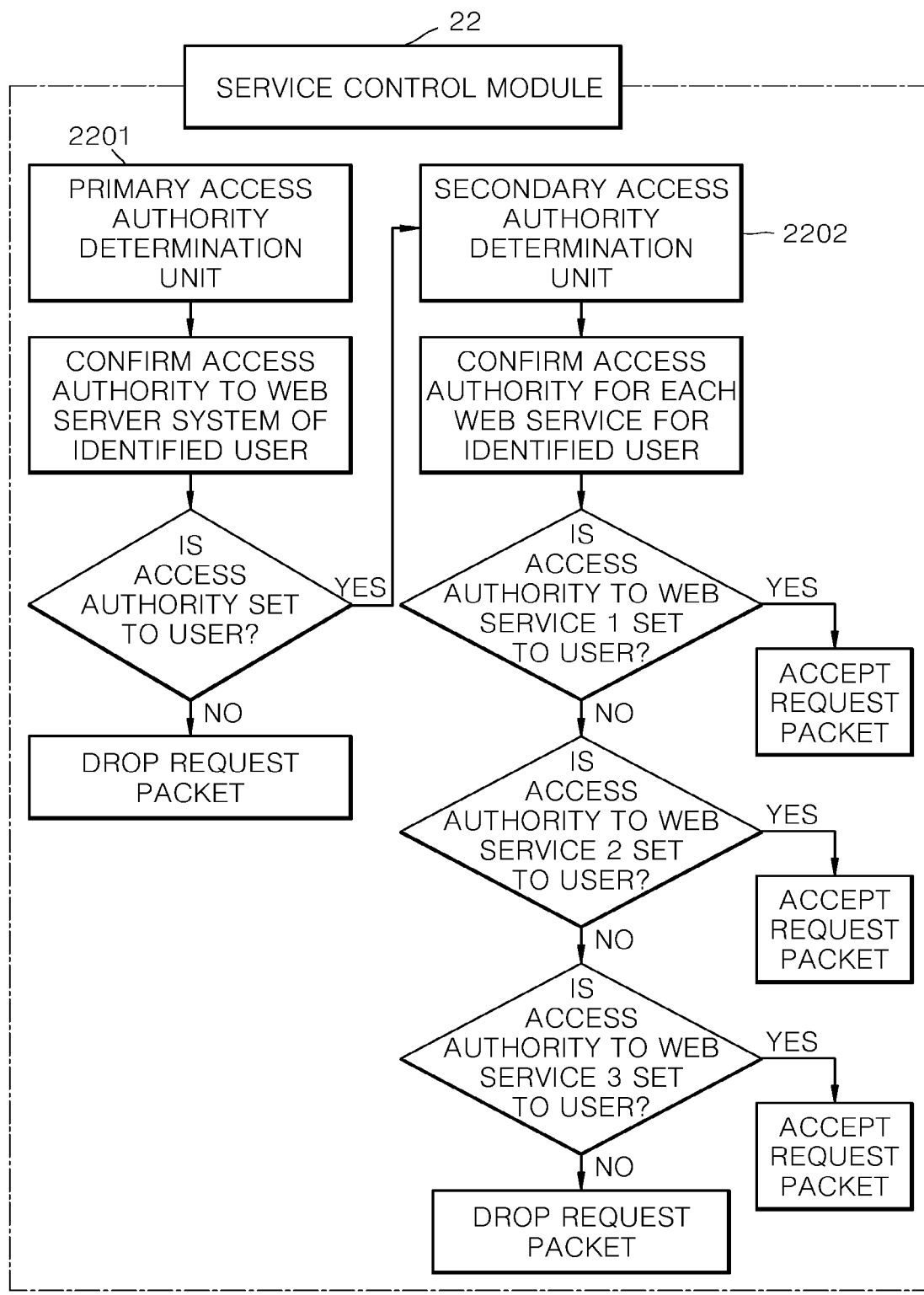

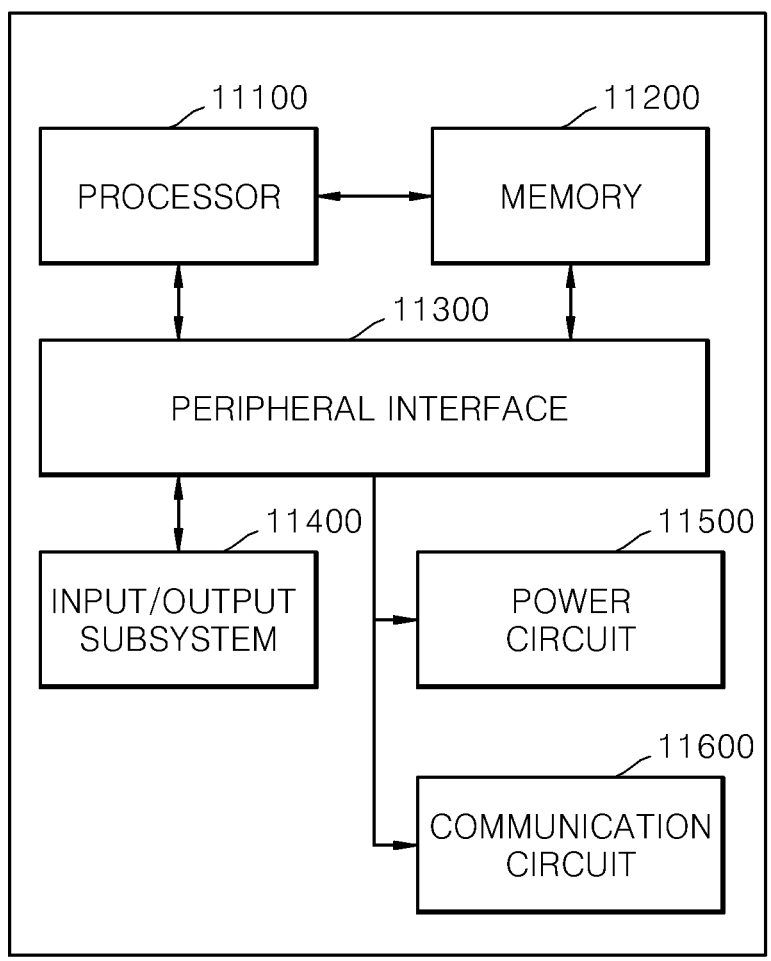
[FIG. 5]

APPARATUS FOR CONTROLLING AND BLOCKING USER ACCESS USING WEB APPLICATION PROXY

BACKGROUND OF THE INVENTION

1. Field of the Invention

The present invention relates to an apparatus for controlling and blocking user access by using a web application proxy, and more specifically, to a technology for confirming access authority of a user who attempts to access a web service from the outside to control access for an authorized user and block an unauthorized user from accessing the web service.

2. Description of the Related Art

Recently, due to the pandemic caused by COVID-19, companies' demand for remote work has increased for the purpose of forming a more flexible working system, resulting in changes in the working environment.

In general, when a user works remotely, the user accesses a corporate Intranet through a virtual private network (VPN), and as the VPN usage rate increases, the occurrence rate of related intrusion accidents is being increased, and it is analyzed that the increase in the occurrence rate of intrusion accidents is due to the increase in access to internal corporate resources that are accessible only within the company using personal terminals from the outside, resulting in creation of an environment that is susceptible to security threats such as unauthorized access.

Meanwhile, there is limitation to deal with the increase in the occurrence rate of intrusion accidents because it is impossible to prevent attacks from internal users or data leakage, and this is because internal access is considered reliable and focus is concentrated to block access from the outside in a security equipment-based system such as an intrusion detection system (IDS) and an intrusion prevention system (IPS) as well as conventional firewall-based security equipment for implementing a firewall in a gateway in order to protect a private network from undesired network access as disclosed in Korean Unexamined Patent Publication No. 10-2018-0132868. Therefore, there is a need to develop a new zero-trust-based security system to reduce the intrusion accident by allowing only minimal authority while ensuring reliable identity of users who access the corporate Intranet using any network regardless of the inside/outside.

SUMMARY OF THE INVENTION

Accordingly, an object of the present invention is to provide a technology for improving network security by confirming access authority of users who attempt to access a web service through an external network to allow a user side having access authority to access the web service and disallow a user side having no access authority to access the web service.

In addition, another object of the present invention is to provide a technology for enhancing the internal security of a company or the like and enhancing work efficiency and usability in daily work by implementing a zero-trust-based security architecture to construct a safer remote work environment.

To achieve the above objects, according to one embodiment of the present invention, an apparatus for controlling and blocking user access using a web application proxy, which is implemented in a computing device including one or more processors and one or more memories for storing instructions executable in the processors, the apparatus including: a web server system in which one or more web services are running; and a web application proxy installed in the web server system, and configured to determine whether to provide the user with the web service provided by the web server system by confirming access authority of a user who attempts to access a web service, which is provided by the web server system, using an external network, wherein the web application proxy includes: a packet processing module configured to collect and analyze request packets transmitted to the web server system by an external user; a service control module configured to control user access to the web service, which is provided by the web server system, by extracting identification information of the user from the packets collected and analyzed by the packet processing module to confirm whether the user of the extracted identification information has the access authority to the web service; and an external policy management module configured to collect and manage an updated access control policy of the user and an updated policy for the web service by communicating with an external integrated policy management server.

In this case, the packet processing module may collect the request packets received by the web server system through the external network by using a netfilter operating in a kernel area, and collect the request packets through an inline method.

In addition, the packet processing module may classify, by a collector, traffic information about packets collected using the netfilter, decode the classified traffic information through a decoder, and then parse the request packets through a parser of an application layer.

In addition, the service control module may include: a primary access authority determination unit configured to determine whether the access authority to the web server system is set to the user by confirming whether identification information, which corresponds to the user of the extracted identification information, exists in a database in which access control information about the web server system is registered; and a secondary access authority determination unit configured to allow only access to the web service, which is confirmed that the access authority is set to the user, by confirming an access control list for each web service that is running in the web server system, when it is determined as a result of performing a function of the primary access authority determination unit that the access authority to the web server system is set to the user.

In addition, according to a result of performing a function of an access authority determination unit including at least one of the primary access authority determination unit and the secondary access authority determination unit, the service control module may issue a drop command for the request packets received from the user to block the user from accessing the web service system or the web service, when it is determined that access authority to the user is not set, and issue an accept command for the request packets received from the user, when it is determined that the access authority to the user is set, thereby allowing the user to access the web server system or the web service.

In addition, the external policy management module may communicate with the external integrated policy management server every predetermined period to collect the updated access control policy of the user and the updated policy for the web service, and then share the updated access control policy of the user and the updated policy for the web service with the service control module, thereby realizing synchronization between the external policy management module and the service control module is performed every predetermined period.

According to one embodiment of the present invention, access authority of users who attempt to access the web service through an external network is confirmed to allow a user side having access authority to access the web service, and disallow a user side having no access authority to access the web service, so that an unknown user having no access authority is blocked from accessing the web server system or a web service, thereby improving network security.

In addition, according to one embodiment of the present invention, in accordance with the trend of changing a work environment such as increasing employees who work outside the boundaries of an existing network due to recent corporate policies or pandemics, that is, telecommuters, the present invention enables users to connect a corporate Intranet through an external network, such as VPN or public Wi-Fi. In this case, a zero-trust-based security architecture is implemented by performing strict access control for accessing company data, services, and resources required to perform a task using a web application proxy, so that it is possible to prevent leakage of sensitive data and strengthen the level of cybersecurity.

In addition, according to the present invention, since the zero-trust-based security architecture is implemented to perform a thorough verification on an access requester, and control the access for allowing only minimum access, thereby minimizing damage that may occur by narrowing a path through which an attack may flow, the present invention can more effectively protect assets of a company by reducing data intrusion accidents and reducing costs in the event of an accident, and can be used as a safe security model.

In addition, according to one embodiment of the present invention, a strong zero-trust-based security architecture is implemented, so that it is possible to construct a more safe remote work environment, thereby providing an effect of enhancing internal security of a company or the like and enhancing work efficiency and usability in daily life.

BRIEF DESCRIPTION OF THE DRAWINGS

FIGS. 1 and 2 are configuration views of an apparatus for controlling and blocking user access using a web application proxy according to one embodiment of the present invention.

FIG. 3 is a conceptual view of performing a function of a packet processing module according to one embodiment of the present invention.

FIG. 4 is a view showing an example of a workflow for performing access authority of a user in stages by a service control module according to one embodiment of the present invention.

FIG. 5 is a view showing an example of an internal configuration of a computing device according to one embodiment of the present invention.

DETAILED DESCRIPTION OF THE INVENTION

Hereinafter, various embodiments and/or aspects will be disclosed with reference to drawings. In the following description, multiple concrete details will be disclosed in order to help general understanding of one or more aspects for the purpose of description. However, it will be recognized by those skilled in the art that the aspect(s) can be executed without the concrete details. In the following description and accompanying drawings, specific exemplary aspects of one or more aspects will be described in detail. However, the aspects are exemplary, and some equivalents of various aspects may be used, and the descriptions herein are intended to include both the aspects and equivalents thereto.

It is not intended that any "embodiment", "example", "aspect", "illustration", and the like used in the specification is preferable or advantageous over any other "embodiment", "example", "aspect", "illustration", and the like.

Further, the terms "includes" and/or "including" mean that a corresponding feature/or component exists, but it should be appreciated that the terms "include" or "including" mean that presence or addition of one or more other features, components, and/or a group thereof is not excluded.

Further, terms including an ordinal number such as "first" or "second" may be used for the names of various components, not limiting the components. These expressions are used to distinguish one component from another component. For example, a first component may be referred to as a second component and vice versa without departing the scope of the present invention. The term "and/or" includes a combination of a plurality of related enumerated items or any of the plurality of related enumerated items.

In addition, unless otherwise defined, all terms used herein, including technical or scientific terms, have the same meaning as commonly understood by one of ordinary skill in the art to which this invention belongs. Terms such as those defined in commonly used dictionaries should be interpreted as having a meaning consistent with the contextual meaning of the related art and should not be interpreted as either ideal or overly formal in meaning unless explicitly defined in the present invention.

The present invention relates to an apparatus for controlling and blocking user access using a web application proxy. Specifically, a first object of the present invention is to provide a technology for improving network security by confirming access authority of users who attempt to access a web service through an external network to allow a user side having access authority to access the web service and disallow a user side having no access authority to access the web service, and a second object of the present invention is to provide a technology for enhancing internal security of a company or the like and enhancing work efficiency and usability in daily life by implementing a zero-trust-based security architecture to construct a more safe remote work environment.

Hereinafter, for a more detailed description of the present invention for achieving the above-mentioned object, the description will be continued with reference to the accompanying drawings, and a plurality of drawings may be referred to at the same time to describe one or more technical features or components constituting the present invention.

First, description will be made in association with an apparatus for controlling and blocking user access using a web application proxy 20 with reference to FIG. 1. The apparatus for controlling and blocking user access using the web application proxy 20 of the present invention includes, as main components, a web server system 10 in which one or more web services are running, and a web application proxy 20 that is installed in the web server system 10 and determines whether to provide a user with the web service, which is provided by the web server system 10, by confirming access authority of a user terminal 1, which attempts to access the web service provided by the web server system 10, using an external network.

Specifically, the web assembly proxy 20 described in the present invention includes a packet processing module 21 that collects and analyzes request packets transmitted to the web server system 10 by an external user, a service control module 22 that controls access of the user for the web service, which is provided by the web server system 10, by extracting identification information of the user from the packets collected and analyzed by the packet processing module 21 to confirm whether the user of the extracted identification information has the access authority to the web service, and an external policy management module 23 that collects and manages an updated access control policy of the user and an updated policy for the web service by communicating with an external integrated policy management server 40.

Hereinafter, description will be made in more detail with reference to FIG. 2. The packet processing module 21 receives request packets transmitted by the user who accesses the web server system 10 through the external network to collect the received request packets using a netfilter operating in a kernel area and collect the request packets through an inline method.

In this case, the expression "collect the request packets through an inline method (or in an inline mode)" means that a bridge-type network is configured to transmit all packets transmitted by the user terminal, which attempts to access the web service server, to a destination via security equipment, since all packets received from an unknown user are monitored and a detailed analysis of the packets is performed before the packets are passed to determine whether the packets are dropped or accepted, a high level of safety can be ensured.

However, since the packet analysis through an inline method is performed by receiving all packets transmitted from an unknown user, equipment failure may occur due to a load, so that in the present invention, a fail-over may be performed with a preparation system through a physical bypass or duplexing, but the present invention is not limited thereto.

Meanwhile, after the request packets are collected through an inline method as described above, traffic information about the packets collected using the netfilter is primarily classified by a collector, the classified traffic information is decoded by a decoder, and then the request packets are parsed by a parser of an application layer.

In this case, the netfilter is a network-related framework in a Linux kernel, and mainly performs a network address translation (NAT) function of converting a private IP address or a public IP address or converting a port, a packet filtering function of implementing a function of controlling access of a server or a firewall by blocking or allowing a specific packet, and a packet mangling function of changing a header value of a packet if necessary.

The netfilter defines a logical packet processing point called a hook, and may be classified into a prerouting hook, an input hook, a forward hook, an output hook, and a postrouting hook according to a processing time point, and in particular, the input hook and the output hook function as an access controller for protecting the server system by transmitting the packets to a local process of the server system or handling processing of the packets transmitted from the local process to the outside.

Meanwhile, describing in more detail the packet filtering process of the netfilter, the netfilter analyzes the header of a passing packet to determine whether the corresponding packet is dropped or accepted.

In general, three basic chains, including an input chain, an output chain, and a forward chain, are provided in a filter table provided in the kernel area, and when a packet reaches one chain, the fate of the packet is determined. For example, when one chain commands to drop the packet, the packet is deleted from the corresponding chain, and when one chain commands to accept the packet, the packet is continuously transmitted to the next chain.

Obviously, in addition to the command for simply dropping or accepting the packet, the netfilter may perform a Stolen command for not transmitting the packet to the destination or a Queue command for transmitting the packet to a queue, but the present invention is not limited thereto.

In particular, according to the present invention, a control for the request packets, which are transmitted by an unknown user, is primarily performed by using the netfilter in the kernel area as shown in FIG. 3, and a packet-based control is secondarily performed on a user stage based on a control log DB 210 that is linked with the packet processing module 21. In this case, the control log DB 210 may store unauthorized log data about access or intrusion event from the outside, and thus monitoring may be performed on the request packets transmitted by an unknown user, and accordingly, the present invention can provide a security model having excellent security.

In addition, the above-described collector primarily classifies the traffic information about the packets collected using the netfilter, in this case, the traffic information may be classified based on the header of packets, and the packets classified based on the header are decoded through the decoder, and then parsing is performed to process and extract only desired information (for example, identification information of a user terminal that attempts to access the web server system 10 through the external network, and information about a target that the user attempts to access) from the decoded packets through the parser of the application layer, which is the highest abstraction layer of a TCP/IP model.

Meanwhile, next, the service control module 22 functions to control user access by confining whether the user of the identification information has the access authority to the web server system 10 or the web service.

In this case, referring to FIG. 4, FIG. 4 shows a workflow for performing the access authority of the user in stages in the service control module 22. Specifically, the service control module 22 of the present invention includes a primary access authority determination unit 2201 that determines whether the access authority to the web server system 10 is set to the user by confirming whether identification information, which corresponds to the user of the extracted identification information, exists in a database 31 in which access control information about the web server system 10 is registered.

In one embodiment, when it is determined that the identification information, which corresponds to the identification information extracted from the user, does not exist in the database 31 in which the access control information about the web server system 10 is registered, the primary access authority determination unit 2201 may issue a drop command for the request packets received from the user by classifying the user as a malicious user having no access authority to block the user who is classified as a malicious user from accessing the web server system 10.

In another embodiment, in addition to the primary access authority determination unit 2201, the service control module 22 may include a secondary access authority determination unit 2202 that allows only access to the web service, which is confirmed that the access authority is set to the user, by confirming an access control list for each of one or more web services that are running in the web server system 10, when it is determined as a result of performing a function of the primary access authority determination unit 2210 that identification information, which corresponds to the identification information extracted from the user, exists in the database 31 in which the access control information about the web server system 10 is registered.

Similar to the mechanism of the primary access authority determination unit 2201, when it is determined as a result of confirming the access control list for each web service that the access authority to the web service is not set to a user side who transmits the request packets and attempts to web service, the second access authority determination unit 2202 may issue a drop command for the request packets transmitted by the user by classifying the user as a malicious user to disallow the user who is classified as a malicious user to access the web service.

Obviously, the second access authority determination unit 2202 may allow the user to access the web server system 10 and the web service by accepting the request packets transmitted by the user, when the primary access authority determination unit 2201 determines that the user is a user having the access authority to the web server system 10 and is also a user having the access authority to all web services that are running in the web service server.

However, the service control module 22 may function to fundamentally block the user from accessing other web services except for the one web service when the primary access authority determination unit 2201 determines that the user is a user who has the access authority to the web server system 10 or a user who has the access authority to one web service that is running in the web service server, and according to the present invention, by performing the function, the access control for allowing only the minimum access is performed through verification of the user who requests the access to the web server system 10 or the web service, thereby minimizing damage that may occur by narrowing a path through which an attack may flow.

Meanwhile, the external policy management module 23 may communicate with the external integrated policy management server 40 every predetermined period to collect the updated access control policy of the user and the updated policy for the web service, and then share the updated access control policy of the user and the updated policy for the web service with the service control module 22, thereby realizing synchronization between the external policy management module 23 and the service control module 22 every predetermined period.

That is, this means that the access authority is newly set or monitoring is performed whether a user who has suspended or lost access authority exists by checking a change in the access control policy of the user for the web server system 10 and the policy for the web service every predetermined period (for example, every hour or every day), and accordingly, it is possible to implement a zero-trust-based security architecture that can quickly respond to with internal/external threats.

Meanwhile, according to the embodiment, the description is limited to that the external policy management module 23 communicates with the external integrated policy management server 40 at a predetermined period to collect the updated access control policy of the user and the updated policy for the web service, but according to another embodiment of the present invention, the external policy management module 23 may communicate with the external integrated policy management server 40 non-periodically, rather than at the predetermined period to collect the updated access control policy of the user and the updated policy for the web service. In this case, non-periodic communication with the external integrated policy management server 40 may be performed when a request for collection of the updated policies is received from an administrator account of the web server system 10 or when the updated policies are collected using a random period, but the present invention is not limited thereto.

In summary, according to the apparatus for controlling and blocking user access using a web application proxy as described above, in the present invention, the access authority of the user terminal which attempts to access the web service through the external network is confirmed to allow the user side having access authority to access the web service, and disallow the user side having no access authority to access the web service, so that an unknown user having no access authority is blocked from accessing the web server system or the web service, thereby improving network security.

In addition, according to one embodiment of the present invention, in accordance with the trend of changing a work environment such as increasing employees who work outside the boundaries of an existing network due to recent corporate policies or pandemics, that is, telecommuters, the present invention enables users to connect a corporate Intranet through an external network, such as VPN or public Wi-Fi. In this case, a zero-trust-based security architecture is implemented by performing strict access control for accessing company data, services, and resources required to perform a task using a web application proxy, so that it is possible to prevent leakage of sensitive data and strengthen the level of cybersecurity.

In addition, according to the present invention, since the zero-trust-based security architecture is implemented to perform a thorough verification for an access requester, and then restricts the access by allowing only minimum access, thereby minimizing damage that may occur by narrowing a path through which an attack may flow, the present invention can more efficiently protect assets of a company by reducing data intrusion accidents and reducing costs in the event of an accident, and can be used as a safe security model.

In addition, according to one embodiment of the present invention, a strong zero-trust-based security architecture is implemented, so that it is possible to construct a more safe remote work environment, thereby providing an effect of enhancing internal security of a company or the like and enhancing work efficiency and usability in daily life.

As described above, although the embodiments have been described by limited embodiments and drawings, those skilled in the art will be able to make various modifications and variations from the above description.

On the other hand, FIG. 5 shows an example of an internal configuration of a computing device according to one embodiment of the present invention. In the following description, unnecessary descriptions for embodiments redundant with those of FIGS. 1 to 4 will be omitted.

As shown in FIG. 5, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device or correspond to the above-described computing device B.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

In this case, access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in the memory 11200, thereby performing various functions for the computing device 10000 and processing data.

The input/output subsystem 11400 may combine various input/output peripheral devices to the peripheral interface 11300. For example, the input/output subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the input/output subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 may use at least one external port to enable communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 5 is merely an example of the computing device 10000, and the computing device 11000 may have a configuration or arrangement in which some components shown in FIG. 5 are omitted, additional components not shown in FIG. 5 are further provided, or at least two components are combined. For example, a computing device for a communication terminal in a mobile environment may further include a touch screen, a sensor, or the like, in addition to the components shown in FIG. 5. The communication circuit 11600 may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

The methods according to the embodiments of the present invention may be implemented in the form of program instructions to be executed through various computing devices so as to be recorded in a computer-readable medium. In particular, a program according to the embodiment of the present invention may be configured as a PC-based program or an application dedicated to a mobile terminal. The application to which the present invention is applied may be installed in a user terminal through a file provided by a file distribution system. For example, a file distribution system may include a file transmission unit (not shown) that transmits the file according to the request of the user terminal.

The above-described device may be implemented by hardware components, software components, and/or a combination of hardware components and software components. For example, the device and the components described above may be implemented using one or more general-purpose or special purpose computers, such as, for example, a processor, a controller and an arithmetic logic unit (ALU), a digital signal processor, a microcomputer, a field programmable gate array (PGA), a programmable logic unit (PLU), a microprocessor or any other device capable of responding to and executing instructions in a defined manner. The processing device may execute an operating system (OS) and at least one software application executed on the operating system.

In addition, the processing device may access, store, manipulate, process, and create data in response to the execution of the software. For the further understanding, in some cases, one processing device may be used, however, those skilled in the art will be appreciated that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, and computer storage medium or device. The software may be distributed over computing devices connected to networks, so as to be stored or executed in a distributed manner. The software and data may be stored in at least one computer-readable recording medium.

The above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable recording media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While the embodiments have been described with reference to limited examples and drawings as described above, it will be apparent to one of ordinary skill in the art that various changes and modifications may be made from the above description. Suitable results may be achieved if the described techniques are performed in a different order, and/or if components in a described system, architecture, device, or circuit are combined in a different manner, and/or replaced or supplemented by other components or their equivalents. Therefore, other implementations, other embodiments, and equivalents of the claims are within the scope of the following claims.

What is claimed is:

1. An apparatus for controlling and blocking user access using a web application proxy, which is implemented in a computing device including one or more processors and one or more memories for storing instructions executable in the processors, the apparatus comprising:
   a web server system in which one or more web services are managed by a web server running on the apparatus to respond to an incoming request from a user of other external computing device over an external network by processing the incoming requests; and
   a web application proxy installed in the web server system configured to inspect the incoming request before the request reaches the web server to determine whether to provide the user with the web service provided by the web server system based on access authority of the user who attempts to access the web service by using the external network,
   wherein the web application proxy includes:
   a packet processing module configured to collect and analyze request packets transmitted to the web server system by the user of the external computing device;
   a service control module configured to control the user access to the web service, which is provided by the web server system, by extracting identification information of the user from the packets collected and analyzed by the packet processing module to confirm whether the user of the extracted identification information has the access authority to the web service; and
   an external policy management module configured to collect and manage an updated access control policy of the user and an updated policy for the web service by communicating with an external integrated policy management server, and
   wherein the packet processing module collects the request packets received by the web server system through the external network by using a netfilter operating in a kernel area, and collects the request packets through an inline method in which a network bridge connecting the external network to an internal network where the web server resides performs an initial security check on the request packets by comparing specific data within the request packets to predefined traffic criteria for passing the request packets to move closer to a final destination of the request packets; and
   wherein the packet processing module performs a secondary security check on the request packets that passed the initial security check by comparing log data of the request packets to a database of log data that records one or more events of unauthorized access or an intrusion attempt to the web server.

2. The apparatus of claim 1, wherein the packet processing module classifies, by a collector, traffic information about packets collected using the netfilter, decodes the classified traffic information through a decoder, and then parses the request packets through a parser of an application layer.

3. The apparatus of claim 1, wherein the service control module includes:
   a primary access authority determination unit configured to determine whether the access authority to the web server system is set to the user by confirming whether identification information, which corresponds to the user of the extracted identification information, exists in a database in which access control information about the web server system is registered; and
   a secondary access authority determination unit configured to allow only access to the web service, which is confirmed that the access authority is set to the user, by confirming an access control list for each web service that is running in the web server system, when it is determined as a result of performing a function of the primary access authority determination unit that the access authority to the web server system is set to the user.

4. The apparatus of claim 3, wherein, according to a result of performing a function of an access authority determination unit including at least one of the primary access authority determination unit and the secondary access authority determination unit, the service control module
   issues a drop command for the request packets received from the user to block the user from accessing the web service system or the web service, when it is determined that access authority to the user is not set, and
   issues an accept command for the request packets received from the user, when it is determined that the access authority to the user is set, thereby allowing the user to access the web server system or the web service.

5. The apparatus of claim 1, wherein the external policy management module communicates with the external integrated policy management server every predetermined period to collect the updated access control policy of the user and the updated policy for the web service, and then shares the updated access control policy of the user and the updated policy for the web service with the service control module, thereby realizing synchronization between the external policy management module and the service control module every predetermined period.

* * * * *